INVENTOR.
CLEAFE A. BEST, JR.

Jan. 20, 1970

C. A. BEST, JR 3,490,697

ULTRASONIC NEBULIZER

Filed Jan. 24, 1968

INVENTOR.
CLEAFE A. BEST, JR.
BY
*Anderson, Spangler & Wymore*

INVENTOR.
CLEAFE A. BEST, JR.

3,490,697
ULTRASONIC NEBULIZER
Cleafe A. Best, Jr., Littleton, Colo., assignor to J. J. Monaghan Company, Inc., Denver, Colo., a corporation of Colorado
Filed Jan. 24, 1968, Ser. No. 700,144
Int. Cl. B05b 1/26, 3/14
U.S. Cl. 239—102                                16 Claims

ABSTRACT OF THE DISCLOSURE

This invention relates to an ultrasonic nebulizer which includes a self-contained low-voltage D.C. power supply, a nebulizer assembly containing a transistorized power oscillator built around a piezoelectric crystal of unique design, liquid reservoir and blower subassembly. Provision is made for varying the D.C. voltage supplied to the oscillator as well as instantaneously shutting off the current to the latter as predetermined maximum values are exceeded. Damage to the crystal occasioned by abnormally low fluid levels is prevented through the use of a novel float switch that becomes operative upon actuation to shut off the power supply. In the interest of obtaining optimum nebulization through oscillation of the crystal, a fluid-level control maintains a substantially constant fluid head thereover.

---

The principle of generating a mist or fog made up of minute liquid droplets through the use of ultrasonic mechanical vibrations as an energy source is, by no means, a new concept; however, the prior art systems based upon this concept have been obsessed with technical and functional problems that have placed severe limits upon their acceptability. Of the many limitations found in the commercially available ultrasonic nebulizers, not all are susceptible of immediate solution while, on the other hand, the unit forming the subject matter of the instant application goes a long way toward solving many of them. For example, the extension of the function of a nebulizer beyond that of a mere water fog generator (i.e. simple "humidification") so as to encompass drug nebulization in a practical form has not yet been achieved. While the present nebulizing apparatus is fully capable of generating a fog made up of minute droplets of a drug in liquid form more efficiently and effectively than the prior art nebulizers, the problems inherent in conducting the mist thus formed to the patient without considerable loss in transmission still remains. An associated problem is that of confining an economically-practical quantity of the drug to a vessel without severely impairing the efficiency of the ultrasonic oscillator in producing a fog therefrom. Accordingly, while the apparatus forming the subject matter hereof is equally effective as a humidifier and a drug nebulizer in terms of producing the desired mist or fog, much is left to be done in terms of transmitting limited quantities of a drug to a patient in this manner without appreciable losses in transit.

There remain, however, a considerable number of deficiencies in the prior art ultrasonic nebulizers which do appear solvable and, in fact, have been solved by the apparatus herein described. To begin with, a major drawback has always been the tremendous bulk of the high-voltage power supplies universally used to drive the oscillator. As a practical matter, these power supplies prevented the units from being readily portable, the latter being a most desirable feature in this type of equipment. The use of a large high-voltage power supply also necessitates the use of heavy-duty shielded power cables connecting the power supply and nebulizing unit. The dangers inherent in the use of such a unit, especially in a high-humidity environment, is also cause for concern.

Another deficiency found in many, if not all, of the prior art units is the failure to provide any control over the output of the power oscillator which, in turn, controls the nebulizer output. Thus, the units are always operated at full output capacity when many circumstances are encountered where less than maximum output is desirable and, perhaps, even necessary.

Probably the most serious problems encountered in the prior art ultrasonic nebulizers have to do with the piezoelectric crystal which constitutes the fundamental component of the system in that its high-frequency vibratory action is directly responsible for generation of the fog. Under ideal conditions, these crystals last only 200 hours or so if unprotected before serious surface cavitation results due to erosion. Crystal failure is greatly accelerated in the presence of corrosive drugs, salt and the like.

Protecting the surface of the crystal with a suitable coating such as, for example, an epoxy resin, increases the useful life thereof several-fold under ideal conditions; however, certain abnormal operating conditions will hasten their premature failure. The presence of corrosive substances capable of eroding or otherwise attacking the protective coating will, of course, quickly destroy the crystal. The main enemy is, however, excessive heat which will melt most epoxy coatings and leave the crystal surface unprotected.

A better approach to crystal design is that of the "sandwich" or laminate wherein the piezoelectric crystal is bonded to a disk of corrosion-resistant metal such as aluminum or stainless steel. Considerable improvement in crystal life is achieved through the use of such a laminate; however, the adhesives employed to bond the two dissimilar materials together is, in the prior art units, vulnerable to excessive heat which destroys the bond and allows the components to separate. Also, stainless steel and aluminum, while advantageous from the standpoint of their corrosion-resistance, are not the best materials to use for maximum transfer of acoustical energy.

One factor which is quite often responsible for crystal destruction in the presently-available ultrasonic nebulizers is the failure to keep it covered with fluid. If the user lets it run dry, overheating occurs and the crystal quickly fails. Accordingly, means should be provided for maintaining a relatively constant fluid level above the crystal and, in the absence thereof, shut off the power supply. Along the same line, the most reliable and efficient operation of the unit is realized when a more or less constant liquid head is maintained above the crystal.

It has now been found in accordance with the teaching of the instant invention that many of the foregoing problems found in the prior art units can be solved. By transistorizing the power oscillator, its bulk can be reduced to a point where it can become a self-contained subassembly inside of the nebulizer case and still remain fully portable. In so doing, the traditional long power coaxial cable leads between the crystal and oscillator are likewise done away with.

Next, by requiring only a relatively low-voltage D.C. power supply (21 volts max.), the heavy shielded coaxial cable necessary in the high-voltage RF units is no longer required. Two incidental, but nevertheless important, advantages accruing to the elimination of the heavy-duty coaxial cable are the improvement in the overall efficiency of the unit and the avoidance of the many problems incident to the use of coaxial cable. Thus, through a more efficient overall system, even though the current values exceed those of the prior art units, the voltages necessary to drive the crystal are a great deal lower as are the maximum wattages.

Considerable improvement has also been made in the crystal itself. The laminated form has been used; however, instead of stainless steel or aluminum being employed, "Pyrex" glass has been bonded to the piezoelectric crystal in the form a ½λ plate at the operating frequency. This special type of glass was found to more closely match the loading on the crystal, thus resulting in a much more efficient transfer of acoustical energy from one material to the other than is possible with stainless steel or aluminum, neither of which match the acoustical impedance of the load closely. Crystals having a useful life in excess of 3000 hours and longer have been made in this fashion. They demonstrate a pronounced resistance to cavitation corrosion and, in addition, show little evidence of having deteriorated under the influence of most drugs and saline solutions.

By mounting a reservoir alongside the crystal chamber with a check valve therebetween and a float valve in the reservoir, it became possible to maintain the fluid level at a relatively constant head above the crystal, thereby improving its efficiency. The float valve is used to trigger a switch and shut off the power supply before crystal damage can occur if the fluid level falls below a predetermined level.

It is, therefore, the principal object of the present invention provide a novel and greatly improved ultrasonic nebulizer.

A second objective of the invention herein disclosed and claimed is to provide a unit of the type aforementioned that includes a miniaturized solid-state ultrasonic generator comprising a crystal, power oscillator and power supply that is considerably more efficient than prior art generators of this type and admits to being packaged in the same envelope as the nebulizer while remaining fully portable.

Another object is to provide an improved long-lived transducer made up as a laminate that includes a ½ wavelength Pyrex plate bonded permanently atop the piezoelectric crystal.

Still another objective is to provide a unit of the class above-described that makes provision for varying the power output of the power oscillator and thus the volume of fog or mist generated within the assembly.

An additional object of the invention is to provide a nebulizer of the ultrasonic type that includes means for maintaining a substantially constant head of fluid above the crystal along with a fluid-level responsive switch operative to shut off the power to the oscillator when the fluid drops below a predetermined level as indicated by said float.

A further object is to provide a fog generator which is compact, lightweight, safe, reliable, efficient, rugged, easy to operate, versatile and decorative in appearance.

Other objects will be in part apparent and in part pointed out specifically hereinafter in connection with the description of the drawing that follows, and in which.

Figure 1:
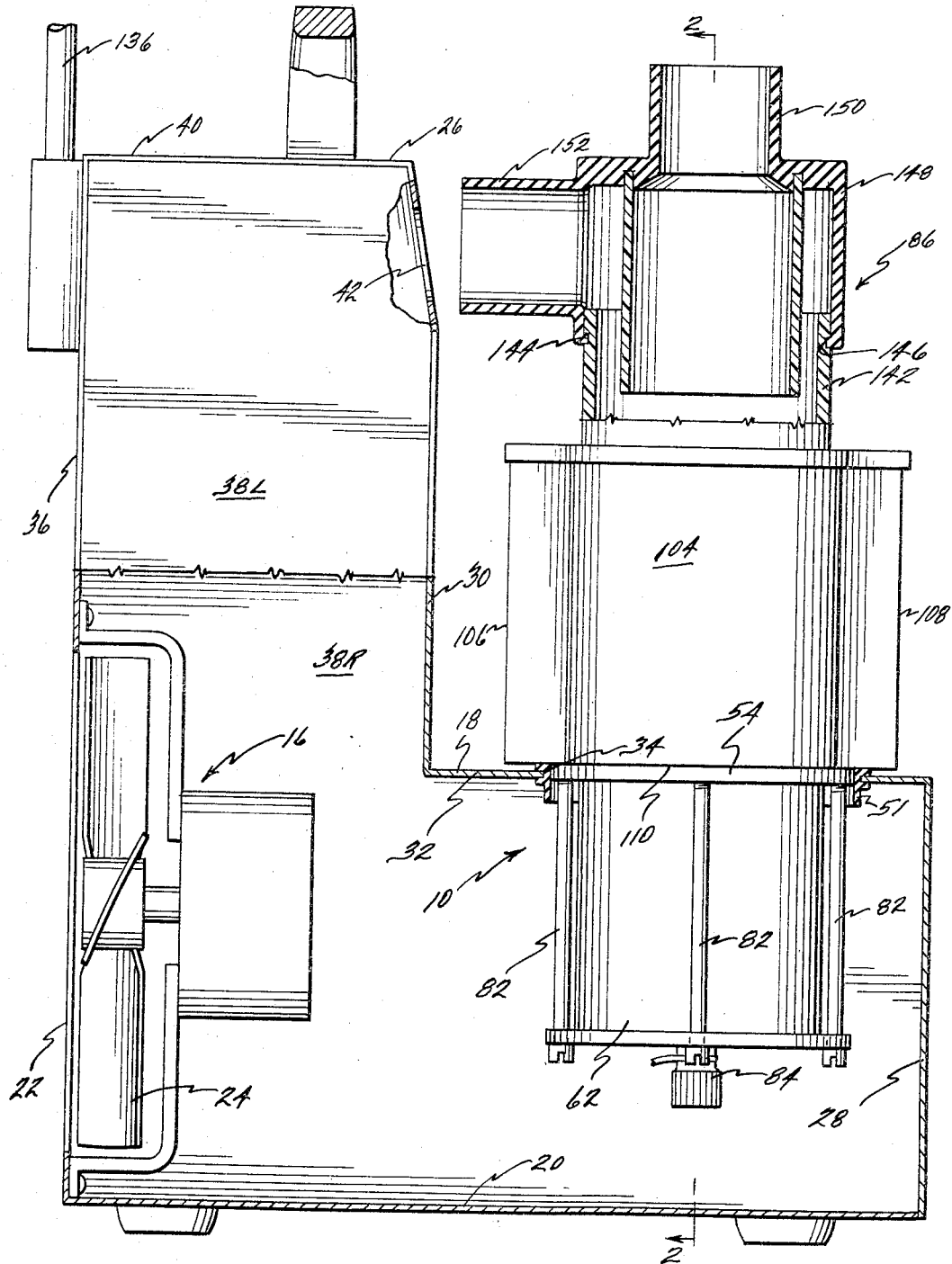
FIGURE 1 is a side elevation of the ultrasonic nebulizer of the present invention, portions of the case having been broken away and shown in section to better reveal the interior construction.
Figure 2:
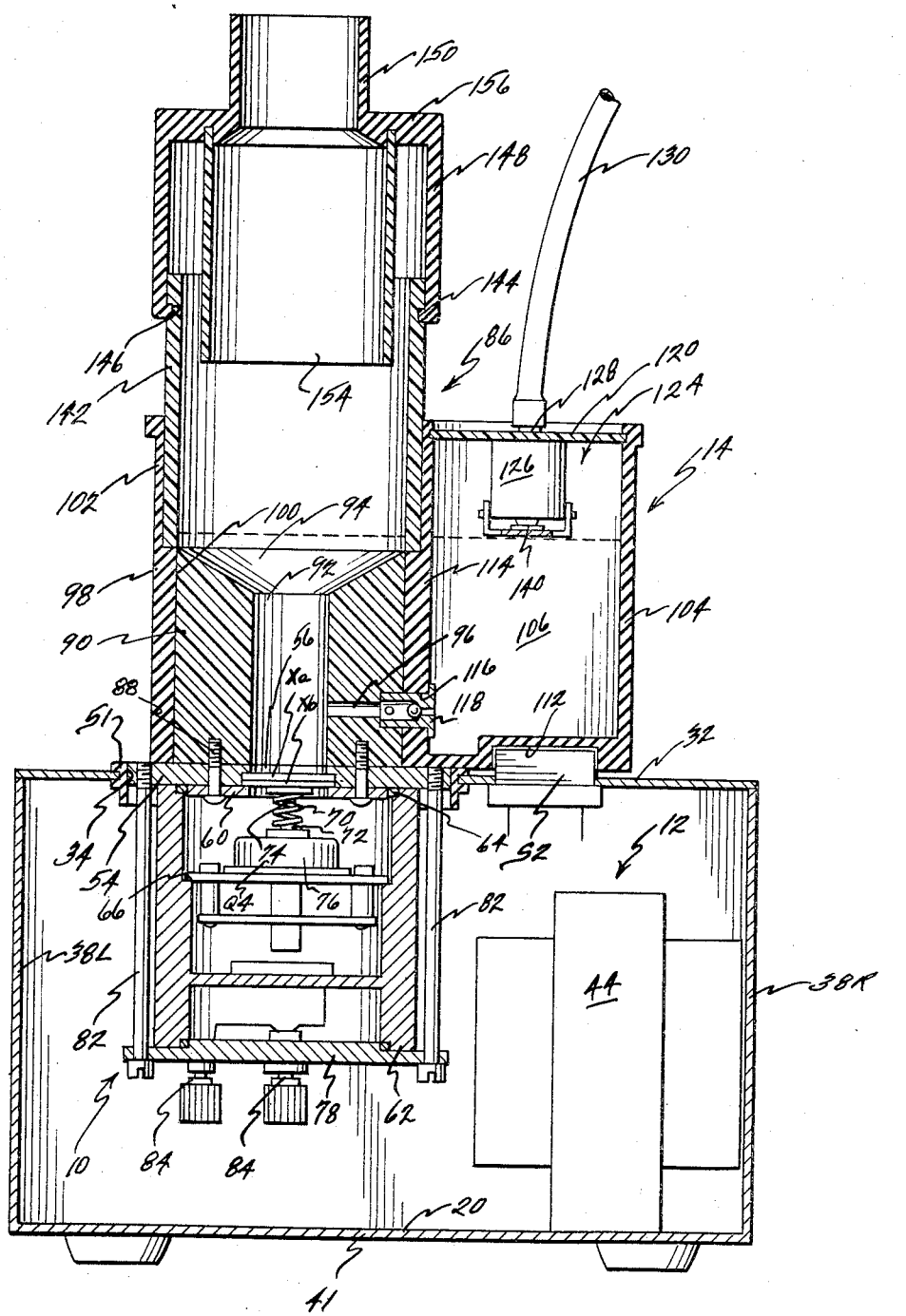
FIGURE 2 is a vertical section taken along line 2—2 of FIGURE 1.

Referring now to the drawings for a detailed description of the present invention and, initially, to FIGURES 1 and 2 for this purpose, reference numeral 10 has been employed to broadly designate the nebulizer subassembly, numeral 12 the low-voltage power supply therefor, numeral 14 the fluid reservoir and numeral 16 the blower mechanism. All of the foregoing components are contained within a common housing 18 or else supported atop thereof. This housing includes a generally-rectangular box-like base structure 20 having an opening 22 in the rear wall thereof over which mounts a small electric blower fan 24. At the rear of the box-like base 20 is an upstanding extension 26 thereof shown in FIGURE 2 that opens above the blower 24 and provides somewhat of a chimney to receive the air drawn into the housing by the latter element. Thus, the front wall 28 of the housing includes a rearwardly offset portion 30 separated from one another by a horizontal platform 32 containing an opening 34 through which the nebulizer subassembly 10 emerges. The upstanding portion 26 of the housing is closed at the rear, sides and top by appropriate wall-forming members 36, 38R, 38L and 40, respectively, that cooperate with bottom wall 41 and panels 28, 30 and 32 already mentioned to complete the housing. The air from the atmosphere taken into the housing through opening 22 by blower 24 is discharged therefrom through air outlet 42 in front panel 30 to be mixed with the fog generated in the nebulizer subassembly 10 in a manner which will be described presently.

Figure 4:
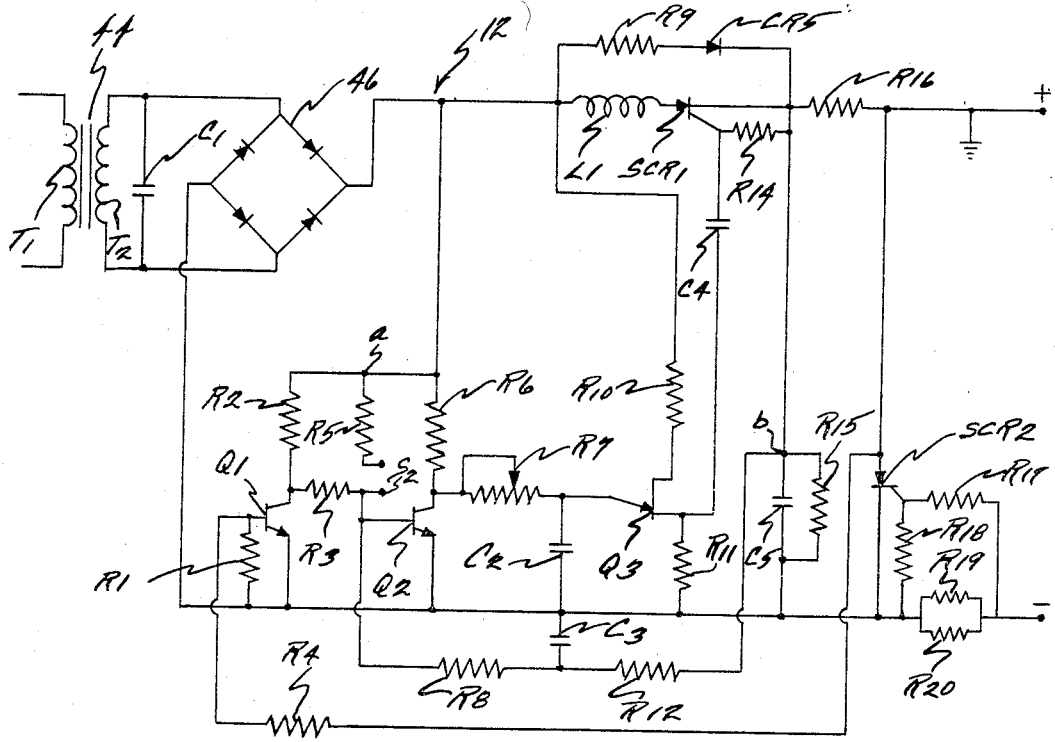
FIGURE 4 is a schematic showing the self-contained solid-state power supply employed to drive the oscillator; and, FIGURE 5 is a schematic of the power oscillator and associated filter network.

Before proceeding with a detailed description of the nebulizer subassembly 10, it would, perhaps, be wise to first describe the low-voltage D.C. power supply represented broadly by the transformer 44 in FIGURE 2 and which has been shown schematically in FIGURE 4 to which reference will now be made. Actually, due to the miniaturization of the power supply, it is entirely contained within the box-like base portion 20 of housing 18 as represented in toto by the transformer.

The basic objective of the power supply 12 is, of course, to supply a D.C. voltage to the power oscillator that will be described presently in connection with FIGURE 5. Other special requirements were to limit the maximum output voltage to around 20 volts and provide for varying the power-output so as to provide for quantitative control over the output from the nebulizer. Additional refinements added to the circuit are automatic shut-down of the power supply and microsecond circuit protection.

Transformer 44 has its primary $T_1$ connected to an ordinary 115 v. A.C. power source which is converted therein to 25 v. A.C. at the output of the secondary $T_2$. This A.C. voltage is rectified and limited in conventional full-wave bridge 46 to a pulsed D.C. voltage of about 30 v. A filter $C_1$ is also shown connected across the transformer secondary.

The basic building block of the power supply circuit provides unijunction control of a silicon-controlled rectifier coupled with capacitance filtering. The charging network consisting of $R_6$, $R_7$ and $C_2$ determines the firing angle of silicon-controlled rectifier $SCR_1$. Transistor $Q_3$ is a unijunction transistor possessing the capability of not conducting until the voltage on its gate is at some specific percentage of the voltage across its two bases. When the voltage on capacitor $C_2$ reaches this predetermined value, the transistor $Q_3$ discharges $C_2$ through resistor $R_{11}$. The voltage pulse thus generated is coupled by capacitor $C_4$ to the gate of $SCR_1$. When $SCR_1$ conducts, it will remain in the conducting state until the circuit is opened, or the voltage at its anode is either reduced to zero or changes sign. In the particular situation represented by FIGURE 4, the voltage goes to zero on each cycle so that $SCR_1$ no longer conducts making it necessary to gate the latter "on" again. Using the unijunction $Q_3$ in combination with the SCR charging circuit ($R_6$, $R_7$ and $C_2$), the instant during the cycle when $SCR_1$ is gated "on" can be controlled. If $SCR_1$ is gated "on" at the beginning of each cycle, this particular circuit could reach an output level of about 30 volts; however, as will be explained presently, the charging network is controlled such that $SCR_1$ is gated "on" later in the cycle where the output voltage from $SCR_1$ is limited to a maximum of only 21 v.

Next, the addition of transistor $Q_2$ to the charging circuit of $SCR_1$ provides a means for protecting the nebulizer subassembly by shutting off the power thereto whenever the water level above the crystal falls below a predetermined level maintained by the float subassembly to be described presently. As long as the bias voltage on the base of $Q_2$ as determined by $R_2$, $R_3$, $R_8$ and $R_{12}$ remains normal, $Q_2$ only functions to delay the triggering of $SCR_1$ so as to limit the output to about 21 v.; therefore, the charging network is left to $R_6$, $R_7$ and $C_2$ as previously described. On the other hand, the application of an abnormal positive bias voltage to the base of $Q_2$ renders it conductive and inhibits the action of the $SCR_1$ charging network to the extent that it will no longer pulse $SCR_1$, thus reducing the power supply output to zero. Thus, $Q_2$ possesses the capability of preventing altogether the firing of $SCR_1$ by the simple expendient of impressing an abnormally-high positive bias voltage to the base thereof. This is done by connecting a positive bias voltage to the base of $R_2$ through $R_5$ and normally-open switch $S_2$, the latter switch being shown in FIGURE 3 as a magnetic switch actuated to closed position as the permanent magnet 48 carried in float 50 falls down in the reservoir 52 due to a low supply of liquid therein.

The next refinement is to provide short circuit protection for the electrical system as well as a microsecond response to protect the power oscillator transistor against overheating, transient power surges and similar abnormal conditions. The foregoing is accomplished by introducing a second silicon-controlled rectifier $SCR_2$ into the circuit connected across the power output. The prime function of $SCR_2$ is to gate "on" whenever excessive current is being drawn by the load while, at the same time, protecting $SCR_2$ against the ravages of excessive current impressed thereupon. Gating of $SCR_1$ must also be terminated; otherwise, the shunting of the full power of the circuit across $SCR_2$ would quickly overheat and destroy it.

The addition of $SCR_2$ together with its associated gating resistor network $R_{17}$, $R_{18}$, $R_{19}$ and $R_{20}$ provide for automatic shunting of the power supply output when the current drawn by the load exceeds a predetermined level. The firing threshold of $SCR_2$ is determined by the aforementioned gating resistor network, particularly, $R_{19}$ and $R_{20}$.

When $SCR_2$ is conducting, the output of $SCR_1$ is divided between $R_{16}$ and $SCR_2$ with $R_{16}$ performing the function of a current limiting resistor for $SCR_2$. The addition of a second transistor $Q_1$ and utilizing the sudden appearance of a low voltage at the anode of $SCR_2$ makes it possible to terminate the firing of $SCR_1$.

By adding transistor $Q_1$ to the circuit as shown to regulate the bias voltage at the base of $Q_2$, it becomes possible to instantly terminate the firing of $Q_3$. When the base of $Q_1$ is positive, it is in the saturated or "on" condition which holds the voltage at the base of $Q_2$ at its normal level where it functions to delay the operation of the unijunction $Q_3$ but still lets the latter trigger $SCR_1$ so that the output therefrom reaches the pre-set 21 v. maximum. If, on the other hand, $Q_1$ is rendered non-conductive by reason of the fact that $SCR_2$ begins conducting so that the bias voltage for $Q_1$ taken off the anode thereof falls nearly to zero, the positive bias at the base of $Q_2$ rises to the abnormal level at which it removes the capability of the charging network to operate the unijunction $Q_3$ that the latter can no longer trigger $SCR_1$. The bias voltage at the base of $Q_1$ is obtained at the anode of $SCR_2$ so that when $SCR_2$ is conducting indicating an abnormal condition, its anode voltage is low so that $Q_1$ becomes non-conductive and $Q_2$ becomes operative to terminate further firing of $SCR_1$. Under normal conditions, $SCR_2$ will be non-conductive thus impressing a high bias voltage at the base of $Q_1$; whereupon, the bias voltage on the base of $Q_2$ is maintained at its normal level.

A problem arises, however, in starting up the system. $SCR_1$ is not conducting; therefore, there is no biasing potential at the anode of $SCR_2$ capable of keeping $Q_1$ conductive so that $Q_2$ will operate at its normal bias. In other words, at "start-up" $Q_1$ acts just as if $SCR_2$ is conducting in response to an overload condition so that $Q_2$ has its positive base bias raised to an abnormal level sufficient to keep unijunction $Q_3$ from triggering $SCR_1$ and the power supply cannot get started. Accordingly, a bypass loop around $SCR_1$ consisting of $R_9$, $CR_5$, $R_{15}$ and $C_5$ connected in parallel, $R_{12}$ and $R_8$ cooperate to produce the normal bias at the base of $Q_2$ which will allow the unijunction $Q_3$ to trigger $SCR_1$ and limit the output of the latter to its 21 v. maximum even though $Q_1$ is still in a non-conductive state. Then, of course, as soon as $SCR_1$ triggers, sufficient positive potential will be available at the anode of $SCR_2$ to close $Q_1$ thereby holding $Q_2$ at its normal base bias potential. It should be noted that the voltage output of loop $R_9$, $CR_5$, $R_{15}$, $C_5$, $R_{12}$ and $R_8$ used to bias $Q_2$ is insufficient to cause the power oscillator connected thereto to operate. The normal bias on $Q_2$ is determined by the differences in voltages between points "a" and "b" in the circuit and the divider network across it, namely, resistances $R_2$, $R_3$, $R_8$ and $R_{12}$.

A few remaining components of the power supply deserve brief mention although they are conventional in circuits of this type. $L_1$ connected in the $SCR_1$ circuit is merely a hash filter while $R_{10}$ in the same circuit is a base two bias resistor for the unijunction $Q_3$. $R_{14}$ is a gate bias resistor for $SCR_1$ that controls the later and prevents run-away operation. $C_3$ is a filter capacitor for the $Q_2$ bias network and $R_1$ is a base bias resistor used to control the operating threshold of $Q_1$.

Next, with reference to FIGURE 5, the power oscillator will be described. The unique feature of the oscillator circuit stems from utilization of the equivalent circuit properties of the piezoelectric crystal in bringing about the proper phase in the feedback circut and in achieving maximum energy transfer from the amplifier to the load when the crystal itself is the load.

The pulsed D.C. output from the power supply is first fed to an R.F. filter consisting of $C_6$, $C_7$ and $L_4$, the sole function of which is to suppress radio frequency interference. As such, this filter is not unique and is shown for the sole purpose of illustrating a complete operative circuit.

Figure 5:
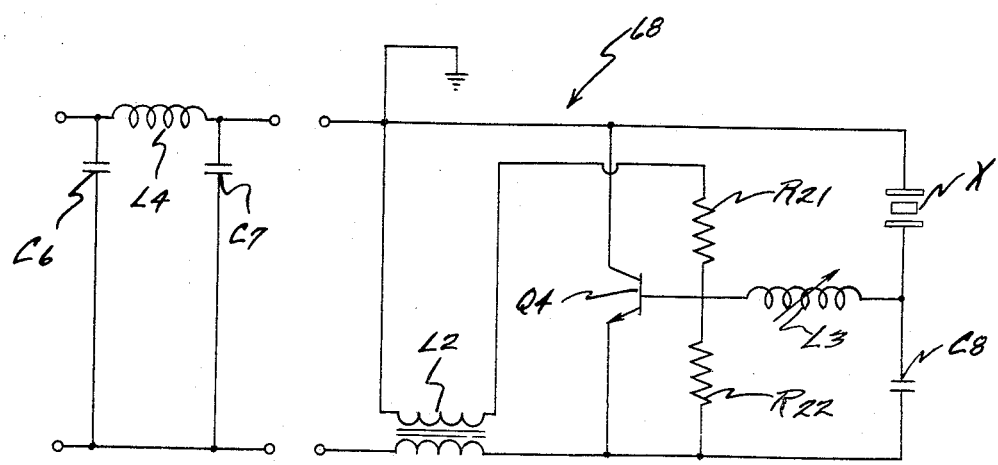

This oscillator circuit of FIGURE 5 utilizes the equivalent inductance of the load which, in this case is the crystal X, when the latter is operated between its resonant and antiresonant frequencies to provide an active element of both the feedback circuit and power matching network. With crystal X performing an active role in the phase shifting network, and quite frequency sensitive, the power oscillator is going to operate at a level where the phase and amplitude requirements of the oscillator are met. As illustrated, the amplifier $Q_4$ is essentially a common emitter amplifier with the collector at both D.C. and R.F. ground. It is operating in the class "C" mode and has its output across the emitter and collector.

To achieve maximum power transfer to the crystal X. the impedance transform and coupling to the load is through a "T-section" network, inductor $L_3$, capacitor $C_8$ and the crystal X acting as an inductor in said network. The toroid $L_2$ is used to isolate the power supply as well as to permit the use of low wattage resistors $R_{21}$ and $R_{22}$ in the biasing of power transistor $Q_4$. Improved efficiency is thus achieved due to less heat being generated.

The resulting circuit provides a power oscillator that is quite stable and efficient. Reliability is also achieved through the use of fewer parts while, at the same time, reducing the bulk of the system considerably. Another significant advantage is that of being able to operate the power transistor $Q_4$ with its case at ground potential thereby improving the heat transfer from the transistor to its mounting.

Referring once again to FIGURES 1 and 2, the opening 34 in horizontal platform 32 of the case or housing is encircled by a grommet 51 that receives disk 54 which is centrally-apertured at 56. Aperture 56 is circular and sized to receive crystal X which is held in place on top by an annular shoulder 58 and on the bottom by a washer 60 bolted to the underside of disk 54.

Projecting downwardly from the underside of plate 54 is a hollow cylindrical member 62 arranged coaxially with the opening 56 in said plate and sealed against the latter by O-ring 64. Part way down inside the hollow interior of element 62 is an annular shoulder 66 upon which rests the elements of the power oscillator subassembly which has just been described with the exception of crystal X, the latter subassembly having been broadly identified by reference numeral 68 in FIGURES 2 and 5. A compression spring 70 formed from electrically-conductive material interconnects the contact 72 of the power oscillator $Q_4$ with the crystal contact 74 so as to form both a mechanical and electrical connection therebetween. The case 76 of transistor $Q_4$ is at ground potential by reason of the fact that it rests upon the ledge 66 of metal element 62, which is grounded as shown schematically in FIGURE 3.

Figure 3:
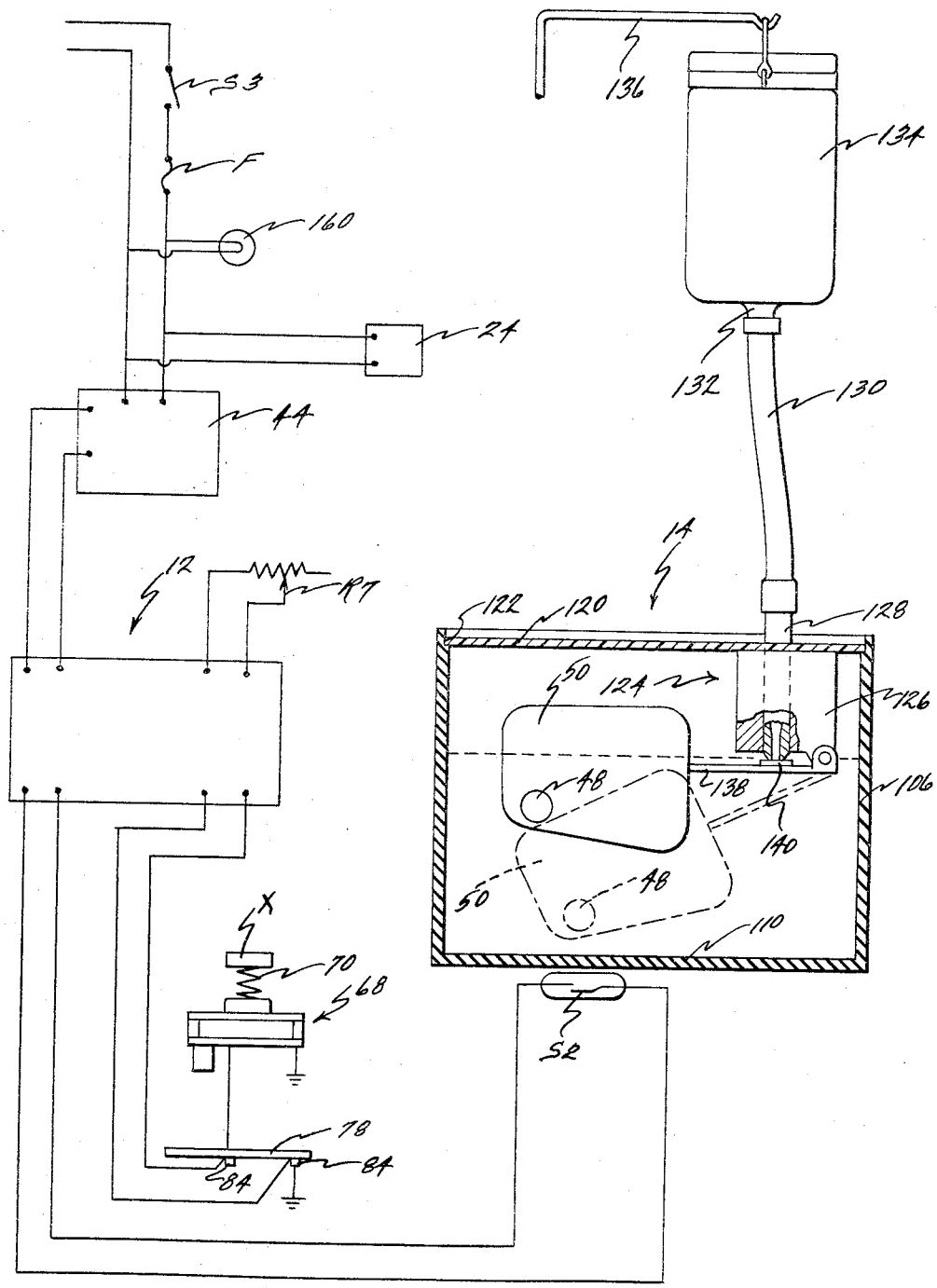
FIGURE 3 is a sectionalized detail of the fluid-level control shown in association with a schematic electrical diagram illustrating the automatic shut-off for the power supply controlled by the float valve along with associated control circuitry.

The lower end of element 62 is closed by a solid metal disk 78 which is sealed against the latter by O-ring 80 and held in position by several long fasteners 82 bolted into the overhanging flange of the upper plate 54. Disk 78 carries a pair of screw-type electrical connectors 84 to which are connected the incoming leads from the power supply and which are, in turn, connected to the power oscillator and ground potential respectively as shown in FIGURE 3. Thus, we are now to the point in the description of the system where ultrasonic vibration of the piezoelectric crystal X can be accomplished, the latter vibrating at approximately 1600 kilocycles. By means of variable resistor $R_7$ in the unijunction charging network of FIGURE 4, it is also possible to vary the power output of the power supply and thereby vary the volume of fog or mist generated from zero to approximately 5 cc. per minute with the system already described.

FIGURE 2 reveals the piezoelectric crystal X as being a laminate made up of top and bottom sections X*a* and X*b*, laid one atop the other and bonded together. These two disk-shaped laminations are fastened together to form a unitary structure by a waterproof high-temperature-resistant epoxy adhesive which forms a permanent bond therebetween. The top layer X*a* in the improved crystal subassembly of the present invention comprises a $\frac{1}{2}\lambda$ plate made of "Pyrex" glass bonded as aforementioned to the piezoelectric crystal X*b*. The crystal thus produced has greater erosion protection than metal-covered crystals, is more resistant to salt and other corrosive chemicals and, most significant, the use of "Pyrex" provides a far superior impedance match between the crystal assembly and water.

Back again to FIGURES 1 and 2, it will be seen that a chimney subassembly indicated in a general way by reference numeral 86 sits atop the crystal to hold the water and direct the fog generated by the nebulizer subassembly. Fastened atop plate 54 by the same screws 88 that hold washer 60 to the underside thereof is an upstanding heavy-walled cylindrical element 90 having an axial opening 92 therethrough of the same diameter as opening 56 in plate 54 including the overhanging lip 58 of the latter. The opening 92 in element 90 flares rapidly at its upper extremity to produce a frusto-conical portion 94. Element 90 also includes a lateral passage 96 that intersects the axial opening 92 intermediate the ends thereof for the purpose of introducing the fluid therein that is to be atomized as will be set forth in detail presently.

Enveloping element 90 is a specially-shaped molded structure 98 which includes as an integral part thereof the fluid reservoir 14. Structure 98 has, at one side thereof, a vertical cylindrical opening 100 sized to fit over and envelop member 90 while, at the same time, forming an upstanding extension thereof in the form of a tubular flange 102 having a slightly larger inside diameter than the portion of element 98 which encloses member 90. Adjoining the tubular portions just described is an integrally-formed generally box-shaped fluid reservoir having a front wall 104, sidewalls 106 and 108 (FIGURE 3), a bottom 110 that includes a depression 112 adapted to house magnetic reed switch $S_2$, and a common rear wall 114 lying adjacent member 90. A port 116 in rear wall 114 connects into passage 96 of element 90 and is oversized so as to accept a small ball check valve 118 that prevents back-flow of fluid from opening 92 in element 90 to the interior of reservoir 14. Switch $S_2$ is actually mounted in platform 32 of the main housing although a portion thereof projects onto the top of said housing into the recess 112 in the bottom of the reservoir as shown in FIGURE 2.

The top of the reservoir is closed by a removable lid 120 that is retained within a groove 122 formed in the vertical walls thereof. Molded structure 98 is fabricated from deformable plastic that will flex to an extent which will free lid 120 from its retaining groove although, obviously, many other constructions and materials will work as well for this purpose.

Next, with particular reference to FIGURES 2 and 3 it will be seen that the lid 120 carries float-type fluid level control valve subassembly on the underside thereof that has been indicated in a general way by numeral 124. This valve assembly includes a block 126 fastened to the underside of the lid with a vertically-disposed inlet tube 128 running down therethrough into the reservoir. The upper end of this inlet tube is connected to a supply hose 130 which is, in turn, connected to the outlet 132 of a container 134 filled with the particular fluid, water or a drug composition, that is to be nebulized. As shown in FIGURE 3, container 134 is suspended for gravity feed on a hanger bar 136 that is removably attached to the back of the main housing as seen in FIGURE 1.

A flapper-type valve member 138 is hingedly attached to member 126 and it carries on the upper surface thereof a seat 140 positioned to contact and form an essentially liquid-tight seal over the outlet end of tube 128. The end of flapper member 138 opposite the hinged end thereof carries float 50 which is, of course, buoyant. Thus, with no liquid in reservoir 14, the float drops down due to gravity and seat 140 uncovers the outlet of tube 128 allowing the reservoir to fill. At the same time, fluid is flowing out of the reservoir past check valve 118 into the fluid cavity 92 above the crystal. Eventually, of course, the fluid in the reservoir raises to the level at which the float closes the flapper upon the outlet of tube 128 and thereafter continues to maintain a substantially constant fluid level indicated by the horizontal dotted lines in FIGURES 2 and 3 until the supply thereof is exhausted in container 134; whereupon, the float will drop down to the dotted line position of FIGURE 3 at which point the permanent magnet 48 carried therein comes in close proximity to magnetic reed switch $S_2$ and actuates the latter closed to shut off the power supply as has been explained previously. Refilling of the reservoir releases switch $S_2$ to its normally-open position so that the power supply and power oscillator can be restarted. With cavity 92 filled with fluid and the crystal vibrating, the fluid is converted into a dense fog or mist having a droplet size of between approximately 1 and 8 microns at a rate up to about 5 cc. per minute.

Returning, once again, to the chimney-like subassembly 86 as seen most clearly in FIGURES 2 and 3, it will be seen that the upstanding tubular flange 102 of element 98 telescopically receives a tubular extension 142 that accepts the fog spreading out into fluted section 94 of chamber 92 and carries it on upward partially confined. Extension 142 has an annular groove 144 adjacent the top edge thereof that receives the inturned flange 146 at the base of cap member 148. Cap 148 is rotatably mounted atop tubular extension 142 and it includes an upwardlyopening tubular outlet 150 and a similar side-opening tubular inlet 152 located at approximately the same level as air outlet 42 in the front wall 30 of the main housing. Both tubular elements 150 and 152 are, in the particular form illustrated, of lesser interior diameter than the inside of extension tube 142 and the main hollow cylindrical sidewall of the cap. A tubular baffle 154 extends downwardly from the top 156 of the cap in spaced relation inside the hollow cylindrical walls of both the cap and extension 142. Thus, the fog generated in chamber 92 can pass up through the lower part of extension 142, thence pass into baffle 154 and out through chimney-like outlet 150 with little, if any, escaping through side inlet 152. On the other hand, air leaving the blower housing through air outlet 42 and entering the chimney-structure 86 through inlet 152 must pass down into the annular space between the cap wall and baffle before mixing with the fog and passing out through the chimney 150. It is a simple matter to control the volume of air mixed with the fog by merely turning cap 148 to one side or the other so that air inlet 152 and air outlet 42 are not in direct alignment with one another. Actually, by mixing the fog with air, the unit has an output that can go as high as 20 liters per minute. It should, perhaps, be mentioned that the blower and associated manifold assembly whereby the air is mixed with the fog in the fountain area is not required for many operations such as, for example, humidification of dry gases. On the other hand, the blower and manifold are needed when the unit is employed as a humidifier for tents and face masks. It is worthy of note that most of the prior art blowers in this type of equipment are located at a remote position so that the fog generated in the unit will not be sucked back into the blower housing by the suction fan to damage the delicate mechanical and electrical equipment ordinarily found therein. Here, however, the use of moisture-inhibiting techniques and low voltage circuitry have rendered remote blower location unnecessary as the instrument has been operated for long intervals in atmospheres heavily saturated with such corrosive substances as salt and urea without damage.

Finally, with reference to FIGURE 3 alone, it will be seen that the circuitry includes a main "on-off" switch $S_3$ connected into the line circuit along with a fuse "F" and a pilot lamp 160 to show when the unit is operating. Block 44 represents the transformer converting the 115 v. A.C. line voltage to 25 v. A.C. to be fed to the power supply circuit indicated broadly by block 12. $R_7$ is, of course, the variable resistor in the charging network for the unijunction $Q_3$ which is mounted on the face of the housing where it is accessible to control the fog output. Block 24 is, of course, the blower fan motor.

Having thus described the several useful and novel features of the instant ultrasonic nebulizer, it will be apparent that the many worthwhile objectives for which it was developed have been achieved. Although but a single embodiment of the invention has been illustrated and described, I realize that certain changes and modifications therein may well occur to those skilled in the art within the broad teaching herein; hence, it is my intention that the scope of protection afforded hereby shall be limited only insofar as said limitations are expressly set forth in the appended claims.

What is claimed is:

1. The ultrasonic nebulizer which comprises: a direct current power supply; a power oscillator including piezoelectric crystal means connected to the power supply and adapted upon energization to vibrate at an ultrasonic frequency; open-topped chimney-like means supported atop the crystal means adapted to confine a column of fluid to be nebulized thereabove; fluid reservoir means located adjacent said chimney-like means adapted to store a supply of fluid; conduit means interconnecting the fluid reservoir means and chimney-like means for transferring fluid therebetween; fluid supply means connected to constantly and automatically replenish the supply of fluid in the reservoir means; fluid level control means mounted in the reservoir means automatically operative to maintain a substantially constant fluid level in said reservoir means and said chimney-like means so long as the supply of fluid lasts; and, switch means connected to the power supply operative upon actuation to shut same off, said switch means being operatively associated with the fluid level control means and responsive to movement thereof occasioned by a drop in the fluid level in the reservoir means.

2. The ultrasonic nebulizer as set forth in claim 1 in which: the piezoelectric crystal means comprises a laminate including a piezoelectric crystal bonded to ½λ plate of "Pyrex" glass.

3. The ultrasonic nebulizer as set forth in claim 1 in which: a check valve is provided in the conduit means automatically operative to prevent back-flow of fluid between the chimney-like means and the reservoir means.

4. The ultrasonic nebulizer as set forth in claim 1 in which: the power supply means includes variable resistance means operative upon actuation to vary the power output to the power oscillator means so as to control the volume of nebulized fluid produced by the latter.

5. The ultrasonic nebulizer as set forth in claim 1 in which: the fluid level control means comprises a float-controlled valve operative in response to a lowering of the fluid level in the fluid reservoir means to admit an additional quantity of fluid thereto from the supply thereof.

6. The ultrasonic nebulizer as set forth in claim 1 in which: the fluid level control means includes a float carrying a permanent magnet movable in response to a drop in fluid level to a location in close proximity to the bottom of the reservoir means; and, in which the switch means comprises a magnet switch located adjacent the bottom of the reservoir means in position to be actuated by the magnetic field generated around the permanent magnet as the latter drops below a predetermined level.

7. The ultrasonic nebulizer as set forth in claim 1 in which: the power supply includes means responsive to excessive current drawn by the power oscillator to deenergize said power supply.

8. The ultrasonic nebulizer as set forth in claim 1 in which: the power supply includes a first silicon-controlled rectifier, a unijunction connected to said first silicon-controlled rectifier operative upon actuation to trigger the latter "on," a unijunction charging network connected to the unijunction including a capacitor operative to discharge therethrough as the charge thereon exceeds a preset level at some time prior to expiration of a predetermined cyclic interval, and a first transistor connected to the switch means and to the unijunction charging network responsive to actuation of said switch means into closed position by becoming conductive and thereby rendering said charging network inoperative to actuate the unijunction so as to trigger the first silicon-controlled rectifier.

9. The ultrasonic nebulizer as set forth in claim 1 in which: the chimney-like means includes a nebulized fluid outlet and an air inlet; and, in which blower means including a fan and blower housing having an air outlet is located in close proximity to the chimney-like means, said blower means being operative upon actuation to take air from the atmosphere and deliver same under positive pressure to the air inlet of the chimney-like means to be mixed with the nebulized fluid generated in the latter.

10. The ultrasonic nebulizer as set forth in claim 2 in which: the ½λ half wave "Pyrex" lamination is located atop the piezoelectric crystal in contact with the fluid in the chimney-like means.

11. The ultrasonic nebulizer as set forth in claim 5 in which: the float controlled valve comprises a plate hingedly attached at one end within the reservoir means for movement about a horizontal axis between an upper closed position and a lower open position, said plate carrying a valve seat on the top surface thereof positioned to close the fluid inlet to the reservoir means when said plate is in closed position, and a buoyant float mounted on the end of said plate opposite the hinged end thereof, said float being responsive to a rise in fluid level in said reservoir means to move said plate from open to closed position, and said float responding to a lowering of said fluid level to unseat the said plate to admit more of said fluid.

12. The ultrasonic nebulizer as set forth in claim 8 in which: the power supply includes a second silicon-controlled rectifier connected across the output of the first silicon-controlled rectifier and responsive to excessive current loads developed in the power oscillator, said second silicon-controlled rectifier being non-conductive under normal load conditions and conductive under excessive ones, a second transistor connected to the first transistor and the anode of the second silicon-controlled rectifier operative to render said first transistor inoperative to prevent triggering of the first silicon-controlled rectifier when said second silicon-controlled rectifier is non-conductive, and said second transistor being inoperative to prevent said first transistor from rendering the unijunction inoperative when said second silicon-controlled rectifier is conducting due to the presence of an abnormal load developed in the power oscillator.

13. The ultrasonic nebulizer as set forth in claim 9 in which: the air outlet from the blower housing and the air inlet into the chimney-like means are horizontally aligned; and, in which the portion of said chimney-like means containing the air inlet is rotatable about a vertical axis so as to permit said inlet to be moved out of direct alignment with said outlet thereby varying the volume of air entering said chimney-like means to be mixed with the nebulized liquid.

14. The ultrasonic nebulizer as set forth in claim 12 in which: a bias nework including a third transistor is connected to the first transistor bypassing the first silicon-controlled rectifier, said bias network being operative at start-up to render the first transistor inoperative to prevent triggering of the first silicon-controlled rectifier through the unijunction when said first silicon-controlled rectifier is non-conductive and no voltage appears at the anode of the second silicon-controlled rectifier sufficient to render said second transistor conductive.

15. The ultrasonic nebulizer according to claim 1 wherein the piezoelectric crystal is directly connected to said power oscillator by electrical conducting connection means devoid of coaxial cables.

16. The ultrasonic nebulizer according to claim 15 wherein the connection means consists of spring means under spring bias electrically and mechanically interconnecting said crystal and power oscillator.

References Cited

UNITED STATES PATENTS

| | | | |
|---|---|---|---|
| 3,387,607 | 6/1968 | Gauthier et al. | 239—102 X |
| 3,433,461 | 3/1969 | Scarpa | 239—102 X |

ROBERT B. REEVES, Primary Examiner

H. S. LANE, Assistant Examiner

U.S. Cl. X.R.

222—66; 310—8.3